United States Patent

Ottinger et al.

[11] Patent Number: 5,983,919
[45] Date of Patent: Nov. 16, 1999

[54] AUTOMATIC DRAIN VALVE

[75] Inventors: Lester V. Ottinger, Dunwoody, Ga.;
Dennis E. Collins, Knoxville, Tenn.

[73] Assignee: Drain-All, Inc., Louisville, Tenn.

[21] Appl. No.: 09/159,732

[22] Filed: Sep. 24, 1998

[51] Int. Cl.⁶ ............................................. F16K 31/34
[52] U.S. Cl. ..................... 137/195; 137/413; 137/430; 137/238; 251/58; 251/65; 251/14
[58] Field of Search ................... 137/193, 195, 137/413, 414, 430, 433, 238; 251/58, 65, 14

[56] References Cited

U.S. PATENT DOCUMENTS

| | | | |
|---|---|---|---|
| 1,002,252 | 9/1911 | Fitts et al. | 137/432 |
| 2,189,427 | 2/1940 | Long | 137/432 |
| 2,856,949 | 10/1958 | Branson | 137/172 |
| 2,908,478 | 10/1959 | Starrett | 251/58 |
| 3,245,217 | 4/1966 | Hook et al. | 60/229 |
| 3,257,783 | 6/1966 | Baker et al. | 137/195 |
| 3,980,457 | 9/1976 | Smith | 137/195 |
| 3,993,090 | 11/1976 | Hankison | 137/195 |
| 4,444,217 | 4/1984 | Cummings et al. | 137/195 |
| 4,562,855 | 1/1986 | Cummings et al. | 137/195 |
| 4,574,829 | 3/1986 | Cummings et al. | 137/195 |
| 4,779,640 | 10/1988 | Cummings et al. | 137/195 |
| 5,004,004 | 4/1991 | Cummings et al. | 137/195 |
| 5,014,735 | 5/1991 | Cummings et al. | 137/195 |

OTHER PUBLICATIONS

Van Air Systems, Inc. — Drying, Filtering and Cooling Equipment for Compressed Air and Gas Systems.
Seymour — Sheridan, Inc. — Metal Floats and Small Tanks — Catalog 386.
Hankison — Compressed Air Condensate Drain — Traps Mechanically and Electrically Actuated — VBA–100–1.
Schramm — Compressed Air System Survey.
Deltech — Automatic Drain Valve.
Van Air Systems, Inc. — Drain Tender — The Tough Drain for the Tough Jobs.

*Primary Examiner*—George L. Walton
*Attorney, Agent, or Firm*—Pitts & Brittian, P.C.

[57] ABSTRACT

An automatic drain valve for discharging accumulations of fluids and foreign materials from a fluid handling system. The drain valve (10) comprises a reservoir (14) defining a reservoir volume (15) and a thru-port (28), in fluid communication with the reservoir volume (15), that defines an inlet (30) and terminates in a drainage valve (82) for flowthrough communications with a fluid handling system. An actuating mechanism selectively actuates a valve operator. In the preferred embodiment, a pilot valve (41) is mounted in the reservoir (14) for selectively communicating pressurized air to a valve operator (57), such that the valve operator selectively opens and closes the drainage valve (82) communicating with the outlet (88) of the reservoir (14) for selectively draining the reservoir. The pilot valve (41) includes a sensor tube (42) which defines a valve seat (44) and includes a magnetized valve plug (46) for selectively engaging the valve seat (44), the valve plug (46) having a selected magnetic polarity. A level sensing float (52) disposed within the reservoir (15) carries an annular magnet (56) normally having a polarity opposing that of the valve plug (46) such that the annular magnet (56) acts upon the valve plug (46) selectively opening and closing the pilot valve (81) as the float (52) rises and falls from a raised position to a lower position with the level of liquid within the reservoir (14).

18 Claims, 5 Drawing Sheets

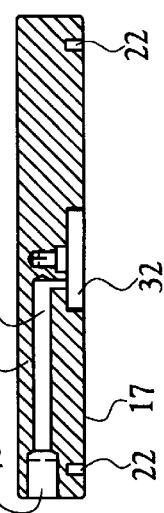
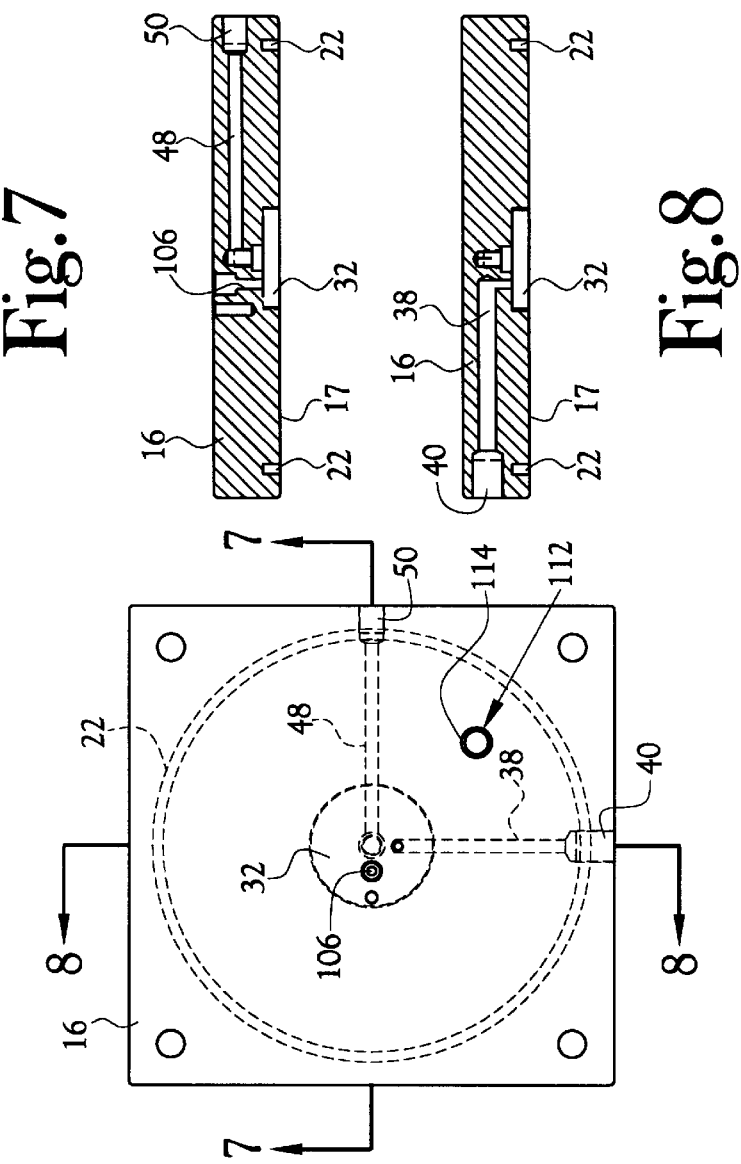
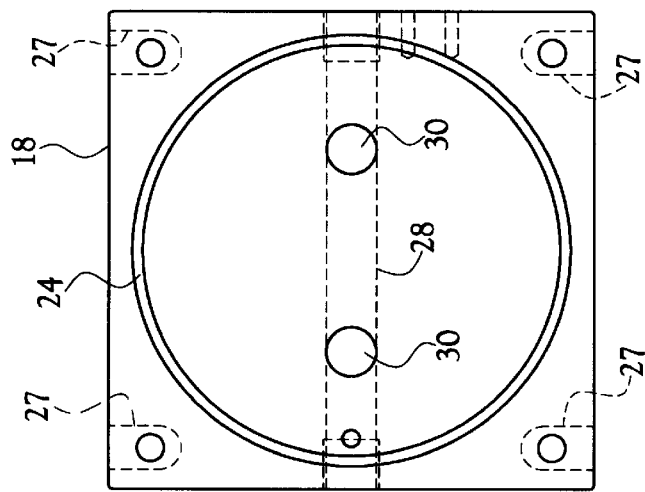

AUTOMATIC DRAIN VALVE

TECHNICAL FIELD

This invention relates to an automatic drain valve for discharging accumulations of condensables, other fluids and foreign materials from various pneumatic, vacuum, or atmospheric systems, fluid handling systems and/or devices.

BACKGROUND ART

In various pneumatic or vacuum systems, atmospheric systems, fluid handling systems and/or devices, broadly referred to as "fluid handling systems" herein, it is necessary to remove condensates, other fluids, (collectively referred to as "fluids" herein), and other foreign materials to insure proper operation. Various devices such as separators, filter traps, dryers, drip-legs, etc., are used for separating out and collecting fluids and other materials, and such devices are generally provided with drain valves for discharging the collected fluids from the pneumatic system or device. Typically, such devices include an air inlet, an air outlet and a mechanism for generating fluids such as a filtering element mounted between the inlet and outlet in the flow path or a process such as changing air and/or surface temperatures. Such devices also include an enclosed geometry such as a reservoir, length of pipe, or filter bowl through which the air flow is at least partially passed causing the moisture and other fluids in the air to be collected and condensed on the inside surface of the reservoir or bowl. The force of gravity causes such condensed materials to accumulate at the bottom of the reservoir together with any other foreign objects. Periodically, this accumulated material and liquid must be discharged when the reservoir or filter bowl has become full of material.

Numerous drain systems have been devised for the discharge of the accumulated material. Two such devices are shown in U.S. Pat. No. 3,980,457, issued to J. I. Smith on Sep. 14, 1974, and in U.S. Pat. No. 3,993,090, issued to Paul M. Hankison on Nov. 23, 1976. In the first of these two patents, there are a pair of valves, a pilot valve and a discharge valve. The pilot valve is magnetically operated and includes a float which moves in response to changes in the liquid level within the reservoir to magnetically open and close a fluid valve in response to that liquid level. Opening of the fluid valve may thereafter cause the opening of the second valve for other operations such as the drainage of the reservoir. In the second of the patents, there are also two valves, a pilot valve and a discharge valve. In this device, a float is held in a submerged condition for a time to create a superbuoyancy condition. When a sufficient superbuoyancy condition is achieved, the float suddenly rises to the surface of the liquid causing a snap action of the pilot valve. This opening of the pilot valve then quickly opens the discharge valve for the removal of material contained within the reservoir. In both of these patents, the pressure of the pneumatic system to which the trap is attached is the driving force that opens the discharge valve.

Since the operating valves and the drain valves are located within the reservoir, various disadvantages exist in the devices described in the above-identified patents. For example, the discharge valve or its operator may be damaged by, or may collect, dirt and other abrasive materials during the discharge operation. Also, they may be affected by corrosive action since they are in contact with the collected material. These deleterious conditions affect the future correct operation of the discharge valve. Further, since the discharge valve is located within the reservoir as part thereof, it is a difficult and an expensive procedure to replace components of this discharge valve. Since the pilot valve also is operated by the air pressure of the pneumatic system to which the reservoir is connected, this valve may become contaminated with some of the impurities.

Other drain valves open in response to a certain amount of fluids or other material being collected. One such drain valve system is disclosed in U.S. Pat. No. 4,779,640 issued to Ernie W. Cummings and Ralph W. Farkas. Another drain valve system is disclosed in U.S. Pat. No. 4,574,829 issued to Ernie W. Cummings and Nick Valk such patent being a continuation-in-part of U.S. Pat. No. 4,444,217, issued Apr. 24, 1984, there being a previously filed continuation-in-part application resulting in U.S. Pat. No. 4,562,855, issued Jan. 7, 1986.

Additional such drain valves are disclosed in U.S. Pat. No. 5,004,004 issued on Apr. 2, 1991, and U.S. Pat. No. 5,014,735 issued on May 14, 1991, both of which were issued to Ernie W. Cummings. The drain valve systems of U.S. Pat. Nos. 5,004,004 and 5,014,735 comprise a reservoir for receiving fluids and other material from a pneumatic system. The inlet is disposed in the base and fluids and other material flows into the reservoir via a port. The reservoir of the drain valve is selectively drained by a valve connected to an outlet port of the drain valve's reservoir. Thus, in order to drain fluids and other particulate material from the pneumatic system, the fluids and other particulate material must flow through the reservoir. However, inasmuch as the trigger point, i.e. the water level required for the float to pop up, is above the annular magnet, as will be appreciated by those skilled in the art, any particulate material that is magnetic, such as rust or other magnetic particulates, can potentially foul the annular magnet and impede the movement of the annular float. In order to open and close the drain valve of the system, a pneumatic valve operator is required, the valve operator being actuated by pressurized air selectively communicated to the valve operator by a magnetically controlled pilot valve. Still other of these known systems and devices for draining pneumatic systems are described in the background section of the above-identified patents and otherwise cited in such patents. Further, various drain valves marketed by Van Air Systems, Inc., Lake City, Pa., and Pa., and Hankison Corporation, Canonsburg, Pa., are illustrative of prior art devices.

Therefore, it is an object of the present invention to provide an automatic drain valve for discharging accumulations of fluids and foreign materials present in fluid handling systems.

Another object of the present invention is to provide a drain valve for fluid handling systems which does not require an external valve operator.

Still another object of the present invention is to provide a drain valve that discharges fluids and other materials without expelling air or other gases from the associated fluid handling system.

A further object of the present invention is to provide an automatic drain valve that is self-flushing so as to be essentially self cleaning.

Yet another object of the present invention is to provide an automatic drain valve which utilizes an internal pneumatic valve operator and an operatively associated linkage assembly for selectively opening and closing the drainage valve of the drain valve.

A further object of the present invention is to provide an automatic drain valve which utilizes a thru-port having direct fluid flow from inlet to outlet and that is in fluid communication with the reservoir such that fluid can flow into the reservoir and selectively activate the drain valve while particulate material is allowed to settle in the thruport.

Still yet another object of the present invention is to provide an automatic drain valve which has a lower trigger point and in which the volume of fluid discharged is not limited by the volume of the reservoir.

Other objects and advantages over the prior art will become apparent to those skilled in the art upon reading the detailed description together with the drawings as described as follows.

DISCLOSURE OF THE INVENTION

In accordance with the various features of this invention, an automatic drain valve for discharging accumulations of fluids and particulate matter is provided. The drain valve includes a reservoir defining a reservoir volume and further includes a head portion and a base portion, with the base portion being provided with a thru-port defining an inlet for being placed in fluid communication with the fluid handling system and which terminates in a drainage valve. At least one conduit is provided to allow fluid communication from the thruport also into the reservoir volume. The drain valve further comprises a mechanism for actuating the drainage valve.

In the preferred embodiment, the drainage valve is actuated by a pneumatically actuated valve operator. In this embodiment, the drain valve further comprises a pilot valve housing mounted within the reservoir volume which defines a cavity sealed against communication with the reservoir volume, the cavity being in fluid communication with a source of pressurized air or gas. A pilot valve is mounted within the cavity of the pilot valve housing, the pilot valve including a sensor tube defining a valve seat and including a magnetic valve plug for engaging the valve seat, such valve plug having a selective magnetic polarity. A buoyant float is also disposed within the reservoir volume. The float is provided with a hole for slidably receiving the pilot valve housing and is movable within the reservoir volume from a lower position to an upper position. Mounted in the float proximate to the valve housing is an annular magnet normally having a polarity opposing the polarity of the magnetic valve plug, such that when the float is in the lowest position or is rising within the reservoir, the annular magnet and the magnetic valve plug oppose each other causing the valve plug to close against the valve seat. When the float reaches its uppermost position, the relative polarity of one of the magnets is effectively reversed causing the valve plug to move away from the valve seat and pressurized air to be communicated to a pneumatic valve operator. The float geometry and relative magnet strengths are chosen so as to allow the float to pop up prior to the water level engaging the annular magnet.

Also provided is linkage means being for connecting the pneumatic valve operator to the drainage valve such that the valve operator selectively opens and closes the drainage valve.

BRIEF DESCRIPTION OF THE DRAWINGS

The above-mentioned features of the present invention will become more clearly understood from the following detailed description of the invention read together with the drawings in which:

FIG. 5 illustrates a top plan view of the base portion of the automatic drain valve of the present invention.

FIG. 6 illustrates a bottom plan view of the head portion of the automatic drain valve of the present invention.

FIG. 7 illustrates a side elevation view of the head portion, in section taken at lines 7—7 in FIG. 6.

FIG. 8 illustrates a side elevation view of the head portion, in section taken at lines 8—8 in FIG. 6.

BEST MODE FOR CARRYING OUT THE INVENTION

Figure 1:
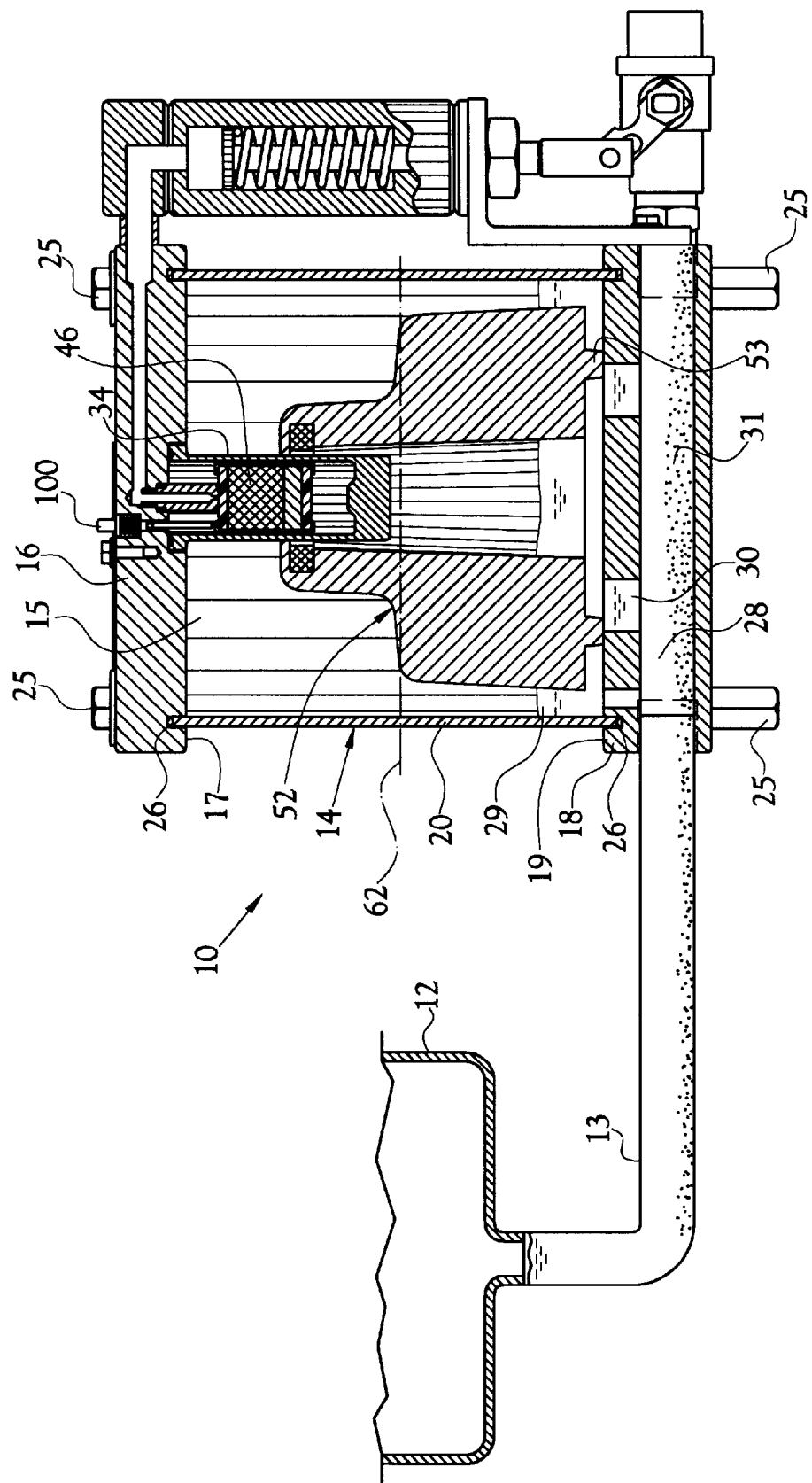
FIG. 1 illustrates a cross-sectional view of an automatic drain valve of the present invention in communication with a fluid handling system and its drain line (both of which are shown schematically and not to scale.)

An automatic drain valve incorporating various features of the present invention is illustrated generally at 10 in the Figures. The drain valve 10 is utilized to automatically drain accumulations of fluids 29 and foreign materials 31 present in a fluid handling system. As used herein, fluid handling system refers broadly to air and/or liquid handling systems including, without limitation, pneumatic, vacuum, or atmospheric systems, and fluid handling systems and/or devices. The valve 10 comprises a reservoir 14 defining a reservoir volume 15 (see FIG. 2). More specifically, the reservoir 14 includes a head portion 16 and a sleeve 20 which extends between the head portion 16 and the base portion 18 so as to form the walls of the reservoir 14. Preferably the sleeve 20 is fabricated of a transparent, or translucent, material such that the fluid level within the reservoir 14 can be viewed from outside of the valve 10. The base portion 18 is provided with a thru-port 28 for connection to a collecting or separating apparatus of fluid generating or other gas system such as a coalescing filter 12, via a drain line 13 and terminating at a drainage valve 82 serving to selectively drain fluids 29 and foreign materials 31 from the thru-port 28. Further, the automatic drain valve of the present invention includes a mechanism for actuating the drainage valve 82. While there are several known mechanisms for actuating the drainage valve 82, in the preferred embodiment, the actuating mechanism is respondable to rising fluid in the reservoir volume 15. The thru-port 28 includes at least one inlet 30 for providing fluid communicates with the reservoir volume 15 such that fluids 29 from, for example, the coalescing filter 12 of a fluid handling system can be communicated through the inlet 30 and into the reservoir volume 15. As fluids 29 seep into the thru-port 28 during the slow flowing fill cycle, foreign material 31 settles to the bottom of thru-port 28 under force of gravity. Thus, the foreign material 31 is substantially prevented from flowing into reservoir 14 thereby preventing foreign matter 31 from fouling the reservoir volume and any valve actuating mechanisms contained therein and from staining the reservoir sleeve 20. In this regard, it is preferable to utilize a sleeve 20 that is transparent, or translucent to allow visual inspection of the level of liquid entrained within reservoir volume 15. Unlike the slow filling process when the drainage valve 82 is closed prior to reaching the trigger point for actuating the drainage valve actuating mechanism, once the trigger point is reached, the reservoir 14 and in the thru-port 28 is put in fluid communication with the atmospheric pressure of the drain line leaving the drainage valve 82. The higher pressure, in pressurized fluid handling systems, for example, in the reservoir 14 and the thru-port 28 causes the fluid therein to rush out of the drainage valve 82 very rapidly. Therefore, during discharge, the fast movement of the fluid 29 and foreign material 31 horizontally straight through the thru-port 28 in the base portion 18 provides a self-cleaning action that moves any foreign material 31 through the drainage valve 82.

Figure 2:
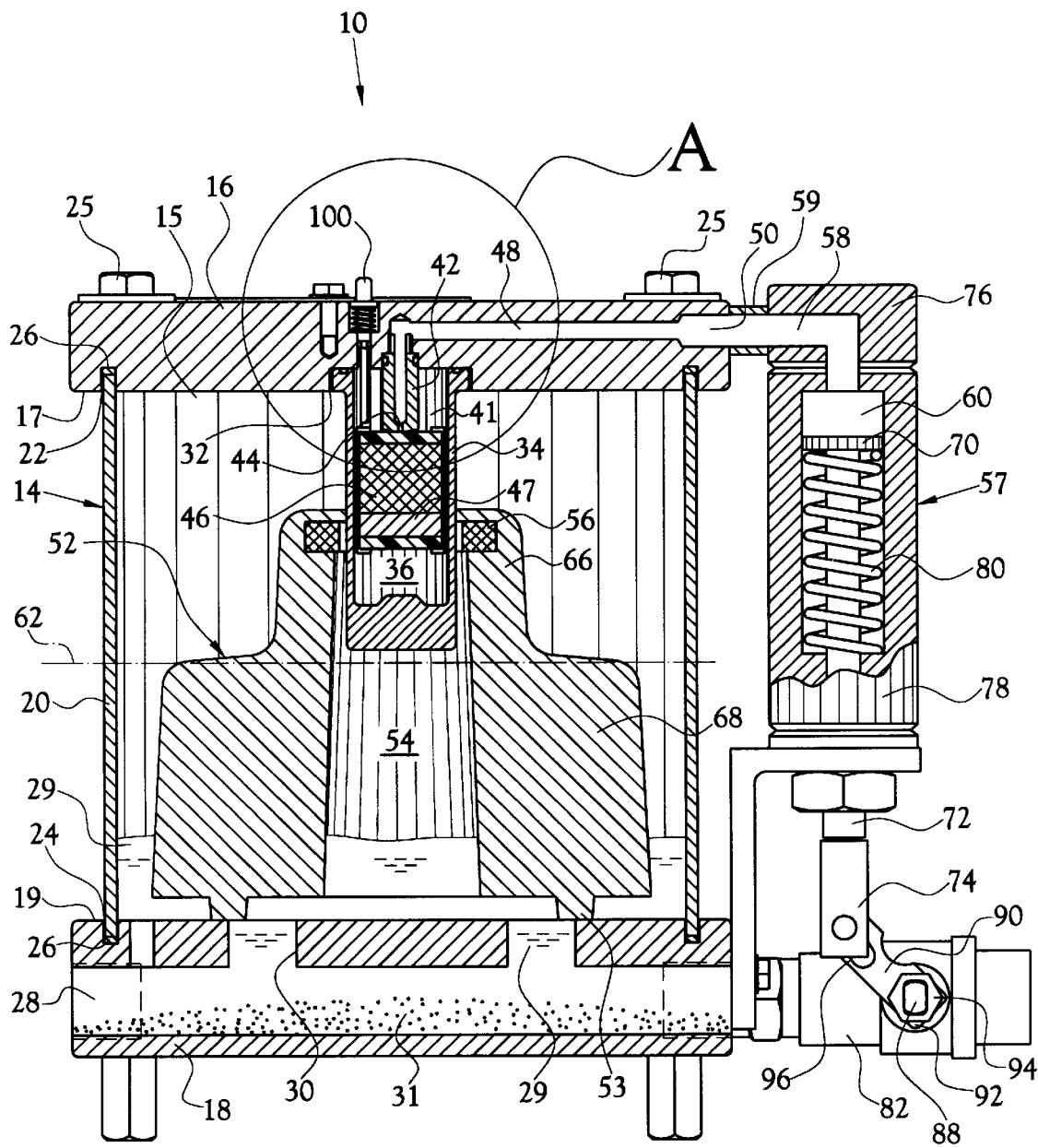
FIG. 2 illustrates a side elevation view, in section, of an automatic drain valve of the present invention with the float resting in the bottom of the reservoir and the drain valve closed.

As illustrated in FIG. 2, in order to facilitate the securing of the sleeve 20 between the head portion 16 and the base portion 18, the lower surface 17 of the head portion 16 and the upper surface 19 of the base portion 18 are provided with annular grooves 22 and 24, respectively, for receiving the opposite ends of the sleeve 20. Further, suitable annular seals 26 are positioned in the grooves 22 and 24 to insure the fluid impervious integrity of the reservoir 14. Of course, suitable securing or clamping means such as the fasteners 25 are provided for securing the sleeve 20 in position between the head portion 16 and the base portion 18. With regard to fasteners 25, in the preferred embodiment, a clevis 27 is provided in the base portion 18 for each fastener 25. The clevis 27 engages the nut of fastener 25 in order to allow removal of fastener 25 without requiring an additional tool.

The preferred embodiment of the drainage valve actuating mechanism is described herein. In this regard, the head portion 16 is also provided, on its lower surface 17, with a hole 32 which is closely receptive of a cylindrical pilot valve housing 34, such that the pilot valve housing 34 depends from the head portion 16, extending downwardly into the reservoir volume 15. The pilot valve housing 34 defines a cavity 36 and the head portion 16 is provided with a second passageway 38 communicating therewith, the second passageway 38 defining a second inlet 40 for connection to a suitable source of filtered pressurized air or other gas. Normally the fluid handling system on which the drain valve 10 is installed is used as the source of pressurized air, with a filter (not shown) being provided between the fluid handling system and the inlet 40 to insure that contaminants from the system do not enter the cavity 36.

It will be noted that the cavity 36 is sealed against communication with the reservoir volume 15 such that fluids 29 do not enter the cavity 36. In this regard, in the preferred embodiment, a face seal defined by O-ring 37 is disposed between the pilot valve housing 34 and head portion 16. In the illustrated embodiment, the O-ring 37 is disposed on pilot valve housing 34. However, it will be recognized that O-ring 37 could be disposed on head portion 16.

The drain valve 10 further comprises a pilot valve 41 mounted axially within the cavity 36 of the pilot valve housing 34. The pilot valve 41 includes a sensor tube 42 defining a valve seat 44 at its lower end, the sensor tube 42 being mounted within the hole 32 of the head portion 16 and disposed so as to extend axially down into the cavity 36. In order to prevent communication between the upper end of sensor tube 42 and the cavity 36 of the pilot valve housing 34 in the preferred embodiment, a bore seal defined by O-ring 43 is disposed on the upper end of sensor tube 42. While a face seal and a bore seal has been described as the preferred means of preventing fluid communication between the respective volumes described hereinabove, those skilled in the art will recognize that other mechanisms and/or sealants can be utilized for this purpose. The pilot valve 41 further includes an axially moving magnetic valve plug 46 disposed in the cavity 36 for selectively engaging the valve seat 44 and closing the sensor tube 42, as will be discussed in detail below. Communicating with the upper end portion of the sensor tube 42 is a third passageway 48 defining an outlet 50 through which pressurized gas supplied to the cavity 36 selectively exits the head portion 16 when the plug 46 is not seated against the valve seat 44.

Figure 3:
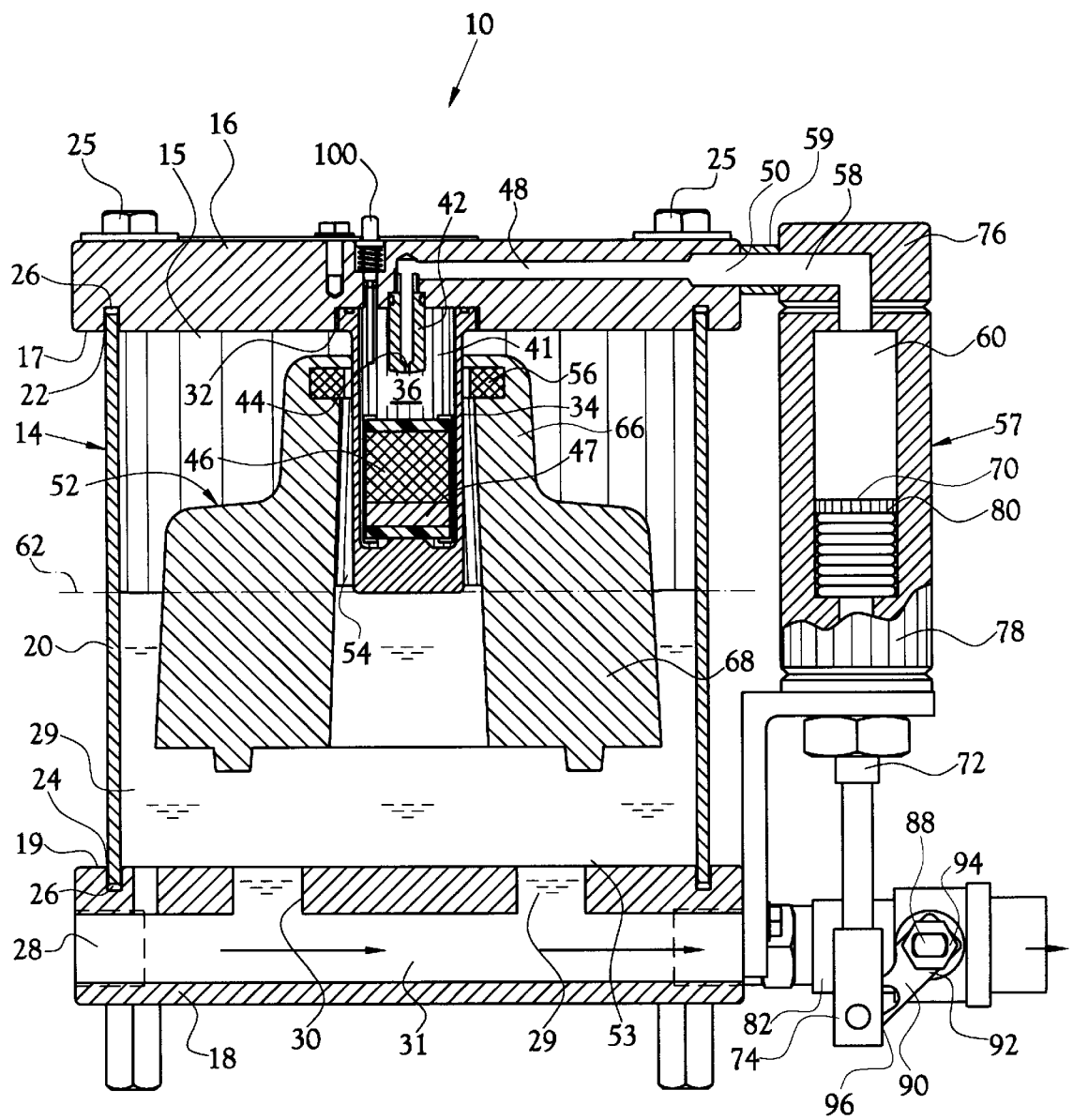
FIG. 3 illustrates a side elevation view, in section, of an automatic drain valve of the present invention with the float popped up so as to activate the pneumatic valve operator and the drain valve opened.
Figure 4:
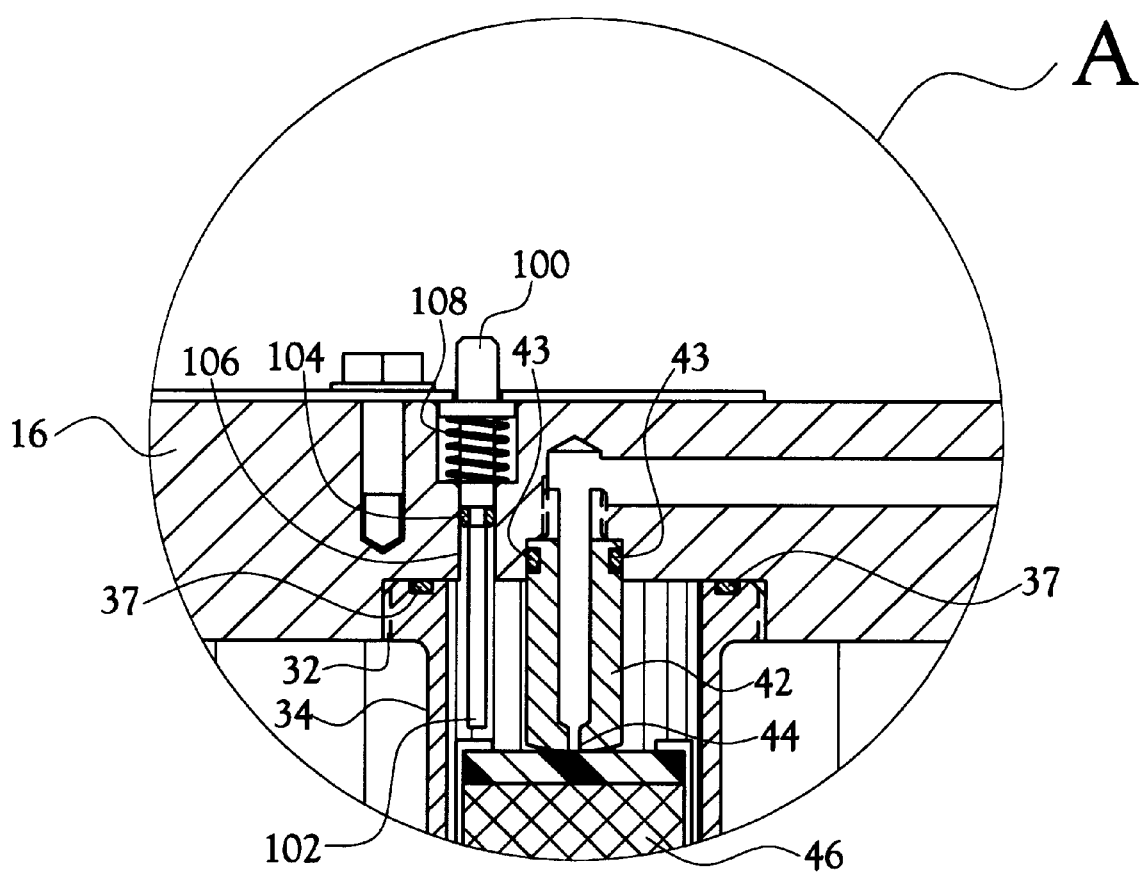
FIG. 4 illustrates an enlarged side elevation view, in section, of the region from FIG. 2 taken at circle "A".

Disposed within the reservoir volume 15 is a buoyant member or float 52 defining an axial hole 54 slidably receptive of the pilot valve housing 34, such that the float 52 is movable within the volume 15 from a lower position wherein the bottom of the float 52 is in contact with, or proximate to, the upper surface 19 of the base portion 18 (see FIG. 2) to a raised position wherein the top of the float 52 is in contact with, or proximate to, the under surface 17 of the head portion 16 (see FIG. 3).

Mounted in the annular walls of the hole 54 of the float 52, proximate the top portion thereof, is an annular magnet 56 which encircles the pilot valve housing 34 and serves as an actuator to move the magnetic valve plug 46 in and out of contact with the valve seat 44 in order to operate the pilot valve 41. In this regard, the polarity of the magnet 56 and the magnetic valve plug 46 is chosen such that when the float is in the lower position or is rising within the reservoir, the magnet 56 and the magnetic valve plug 46 oppose each other causing the magnetic valve plug 46 to close against the valve seat 44. (see FIG. 2). Resultantly, the pressurized gas entering through the second passageway 38 is not allowed to escape the cavity 36 through the third passageway 48.

However, when fluids 29 entering the reservoir from the thru-port 28 through inlet 30 fill the volume 15 to a level sufficient to elevate the float 52 to the upper position, this level being referred to as the trigger point 62, thereby altering the relative position of the magnet 56 and the magnetic valve plug 46 such that they are substantially aligned in height, the magnetic field generated within the magnet 56 causes an effective reversal in the polarity of the magnetic field within the magnetic valve plug 46. This effective reversal is not instantaneous due to the hysteresis of the magnetic plug 46. When polarity of the magnetic field is reversed, the magnetic valve plug 46 is repelled by the magnet 56, and, as a result, moves downwardly in the cavity 36 and away from the valve seat 44. Accordingly, pressurized gas is received through the sensor tube 42 and through the third passageway to exit to outlet 50. It should be noted that in order to insure that the magnetic valve plug 46 properly seals the sensor tube 42 when the pilot valve is closed, the magnetic valve plug 46, or at least the upper portion thereof, can be covered with a rubber material or other suitable sealant material. One suitable covering material is Viton Flourocarbon rubber that provides the desired sealing effect and provides an outer surface which resists the accumulation of liquids and other materials which might affect the proper operation of the valve.

It will be appreciated by those skilled in the art that, in the illustrated embodiment, float 52 does not gradually float upwards as fluids 29 enter reservoir 14. Rather the buoyancy force of float 52 must first overcome the weight of the float 52 and also must overcome the repulsive magnetic force acting between the annular magnet 56 and the magnetic valve plug 46. As described above, the fluid level in reservoir 14 at which the buoyancy force of float 52 is sufficient to overcome these two forces is referred to herein as the trigger point 62. Due to the flow through design of the thru-port 28, it is advantageous to lower the trigger point of the automatic drain valve 10. This is accomplished by altering the geometry of float 52 in a manner to reduce its overall weight. In this regard, the upper end 66 of float 52 has a narrower cross-section than the lower end 68. Additionally, the magnetic forces have been reduced. In this regard, the annular magnet 56 and the magnetic valve plug 46 have been modified to reduce the overall repulsive magnetic force acting therebetween. In this regard, in the prior art devices described in, for example, U.S. Pat. No. 5,014,735, the repulsive magnetic force is approximately eighteen ounces. In the preferred embodiment of the present invention, the repulsive magnetic force acting between the annular magnet 56 and the magnetic valve plug 46 is in a range of approximately 10 to approximately 11 ounces. It will be appreciated that the magnetic valve plug 46 should preferably have a sufficient vertical dimension to prevent the magnetic valve plug 46 from wobbling within the cavity 36 such that the magnetic valve plug 46 does not seal against valve seal 44. In this regard, the spacer 47 is provided. It will be further appreciated that the relative positioning of the magnetic valve plug 46 and magnet 56 is of more importance to the rate of speed at which the float 52 travels in reservoir volume 15. In this regard, the buoyancy of float 52 must merely be sufficient to overcome the repulsive magnetic force acting between the annular magnet 56 and the magnetic valve plug 46.

As indicated above, when the pilot valve 41 is opened in response to fluids 29 rising to the level of the trigger point 62 in the volume 15, a motive source, pressurized gas in the preferred embodiment, exits the outlet 50 of the head portion 16. The outlet 50 is connected in fluid communication with a valve operator 57 mounted on the exterior of the reservoir 14. In fluid handling systems using air or gas under pressure, valve operator 57 is pneumatically actuated.

More specifically, the outlet 50 is connected, as with the tube 59, to an inlet port 58 provided in the first end portion 76 of the cylinder of the pneumatic valve operator 57, so as to communicate with the piston cavity 60 of the valve operator 57. A piston member 70, carrying an actuator arm 72, is slidably mounted within the cavity 60, the actuator arm 72 being slidably received through the hole provided in the second end portion 78 of the cylinder such that the outboard end portion 74 of the arm 72 is external to the cylinder of the valve operator 57. Those skilled in the art will recognize that in vacuum systems, the valve operator would be vacuum actuated rather than pneumatically actuated.

The piston member 70 is capable of reciprocal movement between the first end portion 76 of the cylinder and the second end portion 78 thereof. Moreover, the piston member 70 is biased toward the first end portion 76 of the cylinder by a spring member 80. Thus, in the absence of pressurized air being injected into the cavity 60 via the inlet port 58, the piston member 70 is maintained in the position illustrated in FIG. 2. But, when the pilot valve opens and pressurized gas is injected into the cavity 60 overcoming the bias of the spring member 80, the piston member 70 travels toward the second end portion 78 of the cylinder and assumes the position illustrated in FIG. 3 with the actuator arm 72 assuming a fully extended position.

The reciprocal movement of the actuator arm 72 is utilized to selectively open and close a drainage valve 82, the drainage valve 82 serving to selectively drain both fluids 29 collected in reservoir volume and fluids 29 and other materials from the thru-port 28. Those skilled in the art will recognize that the fluids 29 and other materials that are in the drain line 13 below trigger point 62 will also be drained at this time. In this regard, as discussed above, the drainage valve 82 communicates with the thru-port 28 so as to selectively allow fluids 29 and other material to drain from the thru-port 28 and is opened and closed by selective rotation of the drain valve actuator 88 of the drainage valve 82. In this regard, a linkage member 90 is provided for operatively connecting the actuator arm 72 of the valve operator 57 to the actuator 88. The first end portion 92 of the linkage member 90 is secured to the actuator 88 with a suitable fastener such as the illustrated nut 94 which is received on the threaded stem of the actuator 88. Further, the second end portion 96 of the linkage member 90 is pivotally secured to the outboard end 74 of the actuator arm 72. Resultantly, reciprocation of the actuator arm 72 serves to pivot or rotate the drain valve actuator 88, moving the actuator 88 from a closed valve position, when the actuator arm 72 is retracted, (see FIG. 2) to an open valve position, when the actuator arm 72 is extended (see FIG. 3).

Thus, it will be understood that, in the preferred embodiment, when the level of fluids 29 within the reservoir volume 15 rises to the trigger point 62, raising the float 52, the interaction of the magnetic valve plug 46 and the magnet 56 as described above opens the pilot valve 41 allowing pressurized air to be communicated to the inlet 58. This injection of pressurized air forces the piston member 70 toward the second end portion 78 of the valve operator 57 thereby moving the actuator arm 72 to the fully extended position so as to open the drainage valve 82, allowing the volume 15 to drain. Of course, as the fluids 29 drain from the volume 15 the float 52 drops within the volume 15 until magnet polarity reversal occurs and the plug 46 seats against the valve seat 44, cutting off pressurized air to the piston cavity 60. As a result, the spring member 80 biases the piston member 70 back to its raised position carrying the actuator arm to its retracted position and closing the drainage valve 82. It will be recognized that the magnetic polarity reversal occurs at the top and bottom extremes of travel of the float 52 due to the delay imparted by the magnetic hysteresis during reversal. Resultantly, the pilot valve, and thus the drainage valve 82, operates in a "snap on" and "snap off" manner, insuring that the reservoir volume 15 does not over fill or drain prior to being substantially filled.

The head portion 16 of the reservoir 14 is provided with a further conduit 112 communicating with the reservoir volume 15, the conduit 112 defining an inlet 114 for communicating with a source of air or gas. Generally this source of air or gas is the balance line of the fluid handling system on which the drain valve 10 is installed such that the pressure above the fluids within the volume 15 is substantially equal or slightly less than the pressure within associated fluid handling system.

In the prior art devices, the amount of discharge per cycle was primarily limited by the capacity of reservoir volume 15 since all of the materials to be discharged necessarily had to pass into, be held in and discharged from the reservoir 14. The automatic drain valve of the present invention, utilizing thru-port 28 allows a relatively compact automatic drain valve 10 to be utilized to quickly, and automatically, facilitate the discharge of a large volume of fluid inasmuch as not only is the fluid in the reservoir 14 discharged, but the fluids in the thru-port 28 and in the conduit leading to the thru-port 28 are also discharged. After discharging the fluid below the trigger point 62, the drainage valve 10 stops discharging leaving fluid in the thru-port 28 that serves to maintain a liquid barrier or seal between the pressurized air within, for example, the coalescing filter 12 and the drainage valve 82, thus preventing a loss of compressed air from the fluid handling system during drainage of the fluids from the system. Further, many prior art drain valves generate a great deal of noise when activated, mainly due to the discharge of compressed air that follows the flushing of the fluids. However, the drain valve 10, by preventing a loss of compressed air avoids the noise of the expulsion of compressed air, and the associated cost and inefficiency of lost compressed air.

It should also be noted that in the preferred embodiment the drainage valve 82 comprises a ball valve rather than a poppet valve as is utilized by certain conventional drain valves. In this regard, in such prior art drain valves foreign matter tends to build up on poppet valve surfaces and the associated valve seat prohibiting the valve from properly closing and making frequent cleaning a necessity. However, the ball valve of the present invention shears off dirt and foreign matter from valve surfaces during operation making the valve 82 essentially self cleaning, with the self cleaning ability of the valve being enhanced by the forceful "snap on" and "snap off" operation of the valve operator and valve 82.

Further, the inlet 30 of the thru-port 28 is positioned so as to be below the float 52 and is positioned so as to not be coaxial with, or preferably below any portion of, the hole 54 of the float 52, so as to allow the float 52 to serve as a baffle. In order to prevent the float 52 from obstructing the flow of fluids 29 into the volume 15, the lower end 68 of float 52 is provided with feet 53 which are positioned so as to not register with inlet 30.

In light of the above it will be appreciated that the drain valve 10 automatically accumulates and ejects fluids 29 and solid contaminants 31 from air receiver tanks, airline drip legs, intercooler and aftercooler separators and various other fluid handling systems and devices. The drain valve, when used in conjunction with compressed air systems, 10 can utilize the existing line pressure of the associated fluid handling system to eject fluids without wasting valuable compressed air, and its operation is fully pneumatic such that no electricity is required and the valve is safe for use in flammable environments. The pilot valve 41 and other actuating controls are isolated from the reservoir 15, and the pressurized air actuating the pilot valve 41 is filtered through an air filter (not shown) (ideally 5 micron), so as to reduce the possibility of valve failure and so as to reduce cleaning and maintenance.

In order to test the functioning of the pneumatic valve operator 57, a push-to-test button 100 is provided. In the prior art devices described in U.S. Pat. Nos. 5,004,004 and 5,014,735, a complex valve was utilized that shunted pressurized air from passageway 38 to passageway 48 thus bypassing sensor tube 42 and magnetic valve plug 46. However, it is desirable to test the entire fluid handling system, including sensor tube 42 and magnetic valve plug 46. In this regard, push-to-test button 100 includes an elongated pin 102 that extends through head portion 16 into cavity 36. An O-ring 104 is provided to seal the opening 106 through which the elongated pin 102 extends. The push-to-test button 100 is biased into the upward position by spring 108. Depressing push-to-test button 100 causes the elongated pin 102 to engage and unseat the magnetic valve plug 46 from valve seat 44 allowing pressurized air to flow through sensor tube 42 in the manner described above.

Those skilled in the art will understand that while a particular embodiment of the present invention having application for a fluid handling system has been shown and described, the automatic drain valve of the present invention also has application for other types of systems, including, but not limited to vacuum systems, fluid generating or handling systems, and atmospheric systems and can be adapted to handle a wide range of fluids, for example, hydraulic fluids, oils, solvents or other fluids. While a preferred embodiment has been shown and described, it will be understood that there is no intent to limit the invention to such disclosure, but rather it is intended to cover all modifications and alternate constructions falling within the spirit and scope of the invention as defined in the appended claims.

Having thus described the aforementioned invention, we claim:

1. An automatic drain valve for selectively discharging accumulations of fluids and foreign materials from a fluid handling system, said automatic drain valve comprising:

a reservoir defining a reservoir volume for collecting said fluids, said reservoir including a head portion and a base portion;

a thru-port provided in said base portion, said thru-port defining an inlet for being placed in fluid communication with the fluid handling system and terminating at a drainage valve, said thru-port including at least one inlet into said reservoir volume whereby said fluids are communicated to said reservoir volume during a slow flowing fill cycle and foreign material is allowed to settle under force of gravity in said thru-port thereby substantially preventing the foreign material from flowing into said reservoir and fouling said reservoir and components contained therein, whereby said thru-port and said drainage valve provide flow-through communication with the fluid handling system;

a valve operator for actuating said drainage valves whereby the foreign material is rapidly discharged from said thru-port through said drainage valve upon actuation of said valve operator;

an actuating mechanism associated with said reservoir volume for selectively actuating said valve operator, said actuating mechanism being respondable to liquid in said reservoir volume.

2. The automatic drain valve of claim 1 wherein said valve operator is a pneumatic valve operator.

3. The automatic drain valve of claim 2 wherein said actuating mechanism comprises;

a pilot valve housing mounted within said reservoir volume of said reservoir, said pilot valve housing defining a cavity, said cavity being sealed against communication with said reservoir volume;

a pilot valve mounted within said cavity of said pilot valve housing, said pilot valve including a sensor tube, a valve seat at a first end of said sensor tube, and an axial moving magnetic valve plug of one polarity for selectively engaging said valve seat;

a buoyant float respondable to liquid in said reservoir volume, said float being provided with a hole for slidably receiving said pilot valve housing, said float being movable within said reservoir volume from a lower position to an upper position;

an annular magnet mounted in said float proximate said pilot valve housing, said annular magnet normally having a polarity opposing the polarity of said magnetic valve plug;

a linkage means for connecting said pneumatic valve operator to said drainage valve, whereby said pneumatic valve operator selectively opens and closes said drainage valve; and pneumatic means connected between said pilot valve and said pneumatic valve operator whereby said valve operator quickly opens said drainage valve when said float reaches said upper position and quickly closes said drain valve when said float reaches said lower position, said pneumatic means comprising a first conduit connecting said cavity of said pilot valve housing in fluid communication with a source of filtered air and a second conduit connecting said sensor tube in fluid communication with said pneumatic valve operator.

4. An automatic drain valve for selectively discharging accumulations of fluids and foreign materials from a fluid handling system, said automatic drain valve comprising:

a reservoir defining a reservoir volume for collecting said fluids, said reservoir including a head portion and a base portion, said base portion being provided with a thru-port defining an inlet for being placed in fluid communication with the fluid handling system and terminating at a drainage valve, said thru-port including at least one inlet into said reservoir volume whereby said fluids are communicated to said reservoir volume during a slow filling cycle and foreign material is allowed to settle under force of gravity in said thru-port thereby substantially preventing the foreign material from flowing into said reservoir and fouling said reservoir and components contained therein, whereby said thru-port and said drainage valve provide flow-through communication with the fluid handling system;

a valve operator;

a pilot valve housing mounted within said reservoir volume of said reservoir, said pilot valve housing defining a cavity, said cavity being sealed against communication with said reservoir volume;

a pilot valve mounted within said cavity of said pilot valve housing, said pilot valve including a sensor tube, a valve seat at a first end of said sensor tube, and an axial moving magnetic valve plug of one polarity for selectively engaging said valve seat;

a buoyant float respondable to liquid in said reservoir volume, said float being provided with a hole for slidably receiving said pilot valve housing, said float being movable within said reservoir volume from a lower position to an upper position;

an annular magnet mounted in said float proximate said pilot valve housing, said annular magnet normally having a polarity opposing the polarity of said magnetic valve plug;

a linkage means for connecting said valve operator to said drainage valve, whereby said valve operator selectively opens and closes said drainage valve, where the foreign material is rapidly discharged from said thru-port through said drainage valve upon opening of said drainage valve; and motive means connected between said pilot valve and said valve operator whereby said valve operator quickly opens said drainage valve when said float reaches said upper position and quickly closes said drain valve when said float reaches said lower position, said motive means comprising a first conduit connecting said cavity of said pilot valve housing in fluid communication with a motive source and a second conduit connecting said sensor tube in fluid communication with said valve operator.

5. The automatic drain valve of claim 4 wherein said pilot valve housing includes a face seal for sealing said cavity against communication with said reservoir volume.

6. The automatic drain valve of claim 4 wherein said pilot valve includes a bore seal disposed proximate a second end of said sensor tube for sealing said second end of said sensor tube against communication with said cavity.

7. The automatic drain valve of claim 4 wherein said annular magnet and said magnetic valve plug are selected so as to provide a repulsive magnetic force in a range of approximately ten to approximately eleven ounces.

8. The automatic drain valve of claim 4 wherein said annular magnet is mounted within said float so as to engage and circumscribe said pilot valve housing.

9. The automatic drain valve of claim 4 wherein said buoyant float defines an upper end having a cross-sectional dimension of a first width and a lower end having a cross-sectional dimension of a second width, wherein said first width is less than said second width.

10. An automatic drain valve for selectively discharging accumulations of fluids and foreign materials from a fluid handling system, said automatic drain valve comprising:

a reservoir defining a reservoir volume for collecting said fluids, said reservoir including a head portion and a base portion, said base portion being provided with a thru-port defining an inlet for being placed in fluid communication with the fluid handling system and terminating at a drainage valve, said thru-port including at least one inlet into said reservoir volume whereby said fluids are communicated to said reservoir volume during a slow filling cycle and foreign material is allowed to settle under force of gravity in said thru-port thereby substantially preventing the foreign material from flowing into said reservoir and fouling said reservoir and components contained therein, whereby said thru-port and said drainage valve provide flow-through communication with the fluid handling system;

a pneumatic valve operator;

a pilot valve housing mounted within said reservoir volume of said reservoir, said pilot valve housing defining a cavity, said cavity being sealed against comnunication with said reservoir volume;

a pilot valve mounted within said cavity of said pilot valve housing, said pilot valve including a sensor tube, a valve seat at a first end of said sensor tube, and an axial moving magnetic valve plug of one polarity for selectively engaging said valve seat;

a buoyant float respondable to liquid in said reservoir volume, said float being provided with a hole for slidably receiving said pilot valve housing, said float being movable within said reservoir volume from a lower position to an upper position, said buoyant float defining an upper end having a cross-sectional dimension of a first width and a lower end having a cross-sectional dimension of a second width, wherein said first width is less than said second width;

an annular magnet mounted in said float proximate said pilot valve housing, said annular magnet normally having a polarity opposing the polarity of said magnetic valve plug;

a linkage means for connecting said pneumatic valve operator to said drainage valve, whereby said pneumatic valve operator selectively opens and closes said drainage valve, whereby the foreign material is rapidly discharged from said thru-port through said drainage valve upon opening of said drainage valve; and pneumatic means connected between said pilot valve and said valve operator whereby said valve operator quickly opens said drainage valve when said float reaches said upper position and quickly closes said drain valve when said float reaches said lower position, said pneumatic means comprising a first conduit connecting said cavity of said pilot valve housing in fluid communication with a source of filtered air and a second conduit connecting said sensor tube in fluid communication with said pneumatic valve operator.

11. The automatic drain valve of claim 10 wherein said pilot valve housing includes a face seal for sealing said cavity against communication with said reservoir volume.

12. The automatic drain valve of claim 10 wherein said pilot valve includes a bore seal disposed proximate a second end of said sensor tube for sealing said second end of said sensor tube against communication with said cavity.

13. The automatic drain valve of claim 10 wherein said annular magnet and said magnetic valve plug are selected so as to provide a repulsive magnetic force in a range of approximately ten to approximately eleven ounces.

14. The automatic drain valve of claim 10 wherein said annular magnet is mounted within said float so as to engage and circumscribe said pilot valve housing.

15. An automatic drain valve for selectively discharging accumulations of fluids and foreign materials from a fluid handling system, said automatic drain valve comprising:

a reservoir defining a reservoir volume for collecting said fluids, said reservoir including a head portion and a base portion, said base portion being provided with a thru-port defining an inlet for being placed in fluid communication with the fluid handling system and terminating at a drainage valve, said thru-port including at least one inlet into said reservoir volume whereby said fluids are communicated to said reservoir volume during a slow filling cycle and foreign material is allowed to settle under force of gravity in said thru-port thereby substantially preventing the foreign material from flowing into said reservoir and fouling said reservoir and components contained therein, whereby said thru-port and said drainage valve provide flow-through communication with the fluid handling system;

a pneumatic valve operator;

a pilot valve housing mounted within said reservoir volume of said reservoir, said pilot valve housing defining a cavity, said pilot valve housing includes a face seal for sealing said cavity against communication with said reservoir volume;

a pilot valve mounted within said cavity of said pilot valve housing, said pilot valve including a sensor tube, a valve seat at a first end of said sensor tube, and an axial moving magnetic valve plug of one polarity for selectively engaging said valve seat, said pilot valve including a bore seal disposed proximate a second end of said sensor tube for sealing said second end of said sensor tube against communication with said cavity;

a buoyant float respondable to liquid in said reservoir volume, said float being provided with a hole for slidably receiving said pilot valve housing, said float being movable within said reservoir volume from a lower position to an upper position;

an annular magnet mounted in said float proximate said pilot valve housing, said annular magnet normally having a polarity opposing the polarity of said magnetic valve plug;

a linkage means for connecting said pneumatic valve operator to said drainage valve, whereby said pneumatic valve operator selectively opens and closes said drainage valve, whereby the foreign material is rapidly discharged from said thru-port through said drainage valve upon opening of said drainage valve; and pneumatic means connected between said pilot valve and said pneumatic valve operator whereby said pneumatic valve operator quickly opens said drainage valve when said float reaches said upper position and quickly closes said drain valve when said float reaches said lower position, said pneumatic means comprising a first conduit connecting said cavity of said pilot valve housing in fluid communication with a source of filtered air and a second conduit connecting said sensor tube in fluid communication with said pneumatic valve operator.

16. The automatic drain valve of claim 15 wherein said annular magnet and said magnetic valve plug are selected so as to provide a repulsive magnetic force in a range of approximately ten to approximately eleven ounces.

17. The automatic drain valve of claim 15 wherein said annular magnet is mounted within said float so as to engage and circumscribe said pilot valve housing.

18. The automatic drain valve of claim 15 wherein said buoyant float defines an upper end having a cross-sectional dimension of a first width and a lower end having a cross-sectional dimension of a second width, wherein said first width is less than said second width.

* * * * *